Patented Aug. 2, 1932

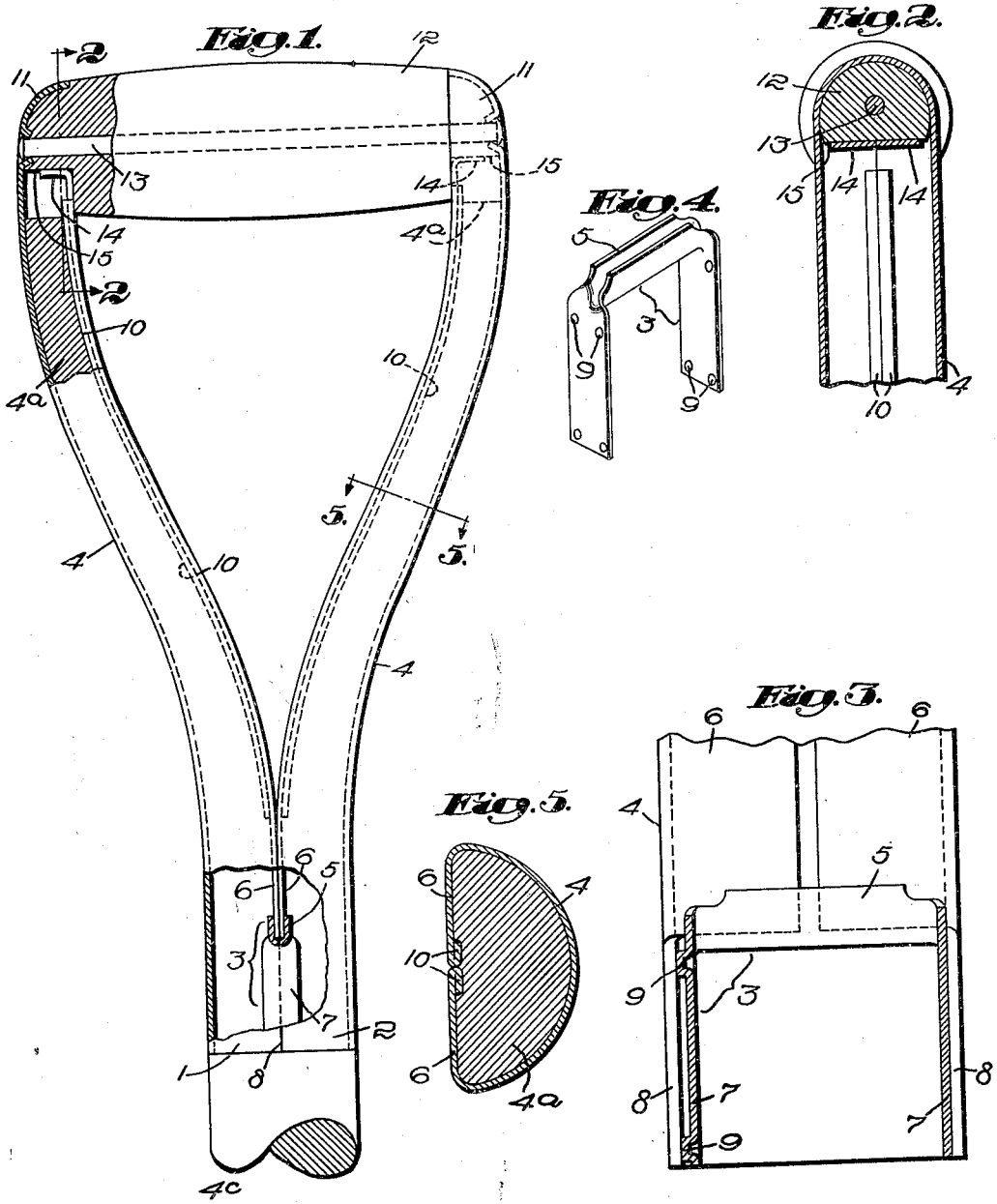

1,869,777

UNITED STATES PATENT OFFICE

WILLIAM A. READY, OF BROOKLINE, MASSACHUSETTS

D-HANDLE FOR SHOVELS AND THE LIKE

Application filed November 18, 1929. Serial No. 407,800.

This invention aims to provide improvements in handles for shovels and the like, and particularly improvements in so-called D-handles.

In the drawing which illustrates a preferred embodiment of my invention:—

Figure 1 is a part elevation and part section of one form of handle illustrating various features of my invention;

Fig. 2 is a section taken on the line 2—2 of Fig. 1 showing the interlock between the metal casing and the grip piece;

Fig. 3 is an enlarged view of the lower end portion of the casing showing the insert member as it appears when one side is welded and showing, in an illustrative manner, the relation of the parts of the insert piece;

Fig. 4 is a perspective view of the insert piece; and

Fig. 5 is an enlarged section taken on the line 5—5 of Fig. 1 to show the cross-sectional shape of one of the arms and the interlock between the casing and the wooden prongs of the stale.

Referring to the drawing which illustrates a preferred embodiment of my invention, I have shown a D-handle for shovels and the like which is an improvement as to some features over the handle shown and described in my co-pending application Serial No. 341,131, filed February 19, 1929.

The method of securing the split stale to the casing is substantially the same as illustrated and described in my co-pending application Serial No. 398,201, filed October 8, 1929, and, therefore, need not be described in detail in this application. However, I wish to have it understood that the handle which forms my present invention is not limited to any single method or type of attachment with a stale, as will be apparent to anyone skilled in the art.

In Figure 1 I have shown a D-handle having a sheet metal part formed of two similar pieces 1 and 2 secured together at their lower ends by means of a U-shaped insert member 3 (Fig. 4) welded to the pieces 1 and 2. From the welded joint the pieces 1 and 2 continue upwardly in diverging relation to provide a pair of hollow arms 4—4.

The U-shaped member 3 which secures the two pieces 1 and 2 together, where the stale enters the handle, has a clip-like base portion 5 which fits over the lower ends of the flanges 6 of the parts 1 and 2 (Figs. 1 and 3) and holds them together. The side legs 7 of the U-shaped member 3 are of substantial width and overlap portions of the inner face of each piece 1 and 2 adjacent to the meeting edges 8 (Fig. 1) and are welded in place in any suitable manner and by any suitable type of mechanism. In the embodiment of my invention illustrated, I have shown (in somewhat exaggerated form) a member of boss portions 9 (Fig. 4) formed on the legs 7 of the U-shaped member 3. These bosses aid materially in securing a strong weld of the parts because they are more or less pressed into the metal of the pieces 1 and 2 when the metal is heated. This method of welding is illustrated in Fig. 3 which shows in a general way one leg 7 and its relation to the part before welding and the other leg after welding.

While the manner of securing the two similar metal pieces of the handle, disclosed in my co-pending application Serial No. 341,131 referred to above, is useful for certain classes of shovels designed for certain work, the U-shaped insert 3 of the present invention is an improvement, because it provides a much stronger connection at a point where considerable stress is exerted, especially in so-called "track shovels".

Each of the hollow arms 4 (Fig. 5) is substantially D-shaped in cross-section throughout the greater portion of its length and the longitudinal edges of the flanges 6 meet (Fig. 2) at the inner face of the arm thereby providing a flat face. In the present embodiment of my D-handle the material at the meeting edges of each arm 4 is bent upon itself to provide beads 10—10 which stiffen the material to such an extent that it is not necessary to weld the edges together. Furthermore, the edges are smooth and rounded and will not injure the hand of a person using the handle. A further feature of the beads 10—10 is the interlock which they make with the wood of the connecting prongs 4ᵃ of the stale 4ᶜ, thereby eliminating the necessity of welding and providing means for preventing spreading of the flanges 6 of the casing, as clearly shown in Fig. 5. This interlock takes place when the wooden prongs 4ᵃ of the stale are forced into the casing, at which time the beads cut into the wood.

Each arm 4 has a grip socket 11 at its free end to receive an end of the grip-piece 12. The grip-piece 12 is held in place in the grip sockets 11 by means of the usual rivet 13 headed at each end against the outer faces of the arms 4—4. Any suitable means for preventing rotation of the grip-pieces 12 may be used, but I have invented novel means for doing this which comprises preformed cooperating flat surfaces of substantial area. These flat surfaces are provided at each socket 11 by means of inwardly bent ears 14—14 at the upper end of each flange 6 of the arms 4—4 (Figs. 1 and 2) and the cut-away portions 15 at the ends of the grip-piece 12. Therefore, when the grip-piece 12 is in position the flat surfaces 15ᵃ at its ends engage the flat surfaces presented by the ears 14—14 and rotation of the grip-piece is prevented.

In assembling the handle I first place the two pieces 1 and 2 with their inner faces in contact and then insert the U-shaped member 3 from the lower end, so that the clip-like base portion 5 will fit over the lower edges of the flanges 6, as shown in Figs. 1 and 3. Then the parts are welded together by applying suitable electrodes to the arms of the U-shaped piece 3 and the members 1 and 2 adjacent to the abutting edges 8, thereby to weld the parts together.

After the metal parts have been welded, the method of attaching the metal part of the handle to the stale 4ᶜ depends largely upon the type and quality of handle desired. The metal handle may be preformed and then secured to the stale 4ᶜ, or it may be attached to the stale 4ᶜ and shaped with the attaching prongs of the stale or the stale may terminate adjacent to the base of the U-shaped member, in which case the metal part would be preformed and secured to the stale by a rivet passing through the lower portion of the metal part and the end of the stale. All of these methods are now well known and, as they do not form a part of my present invention, do not need further explanation.

While I have illustrated and described one embodiment of my invention, I do not wish to be limited thereby, because the scope of my invention is best defined in the following claims.

1. A D-handle construction for shovels and the like comprising, in combination, a sheet metal part composed of two similar pieces, an insert member welded to said two pieces of the casing adjacent to one end of the sheet metal part to unite said pieces at said one end for a portion of their length, and said two pieces diverging from that end, and a grip-piece secured between the spaced ends of said two pieces of the sheet metal part.

2. A D-handle construction for shovels and the like comprising, in combination, a sheet metal part composed of two similar pieces, a substantially U-shaped insert member welded to said two pieces of the casing adjacent to one end of the sheet metal part to unite said pieces at said one end for a portion of their length, and said two pieces diverging from that end, and a grip-piece secured between the spaced ends of said two pieces of the sheet metal part.

3. A D-handle construction for shovels and the like comprising, in combination, a sheet metal part composed of two similar pieces, a substantially U-shaped insert member having a clip-like base engaging both of said pieces of said sheet metal part and having side arms welded to said two pieces of the casing adjacent to one end of the sheet metal part to unite said pieces at said one end for a portion of their length, and said two pieces diverging from that end, and a grip-piece secured between the spaced ends of said two pieces of the sheet metal part.

4. A D-handle construction for shovels and the like comprising, in combination, a sheet metal part having two diverging hollow arms, opposed grip sockets provided at the spaced ends of said sheet metal part, a grip-piece having its ends located in said grip sockets and cooperating preformed flat surfaces of substantial area presented both by the grip-piece and the arms of the casing at the grip sockets to prevent turning of the grip-piece relative to the sheet metal part.

5. A D-handle construction for shovels and the like comprising, in combination, a sheet metal part having two diverging tubular arms of D-shaped cross-section, each arm having longitudinal edges opposing each other along the inner face of the arm, the metal of said arms at said longitudinal edges being bent upon itself, and a grip-piece secured between the spaced ends of said diverging arms.

6. A D-handle construction for shovels and the like comprising, in combination, a sheet metal part having two diverging tubular arms, each arm having longitudinal edges opposing each other along the inner face of the arm, the metal of said arms at said longitudinal edges being bent upon itself, a grip-piece secured between the spaced ends of said diverging arms, a wooden stale split and having the split portions fitting within the arms of the sheet metal part and said inwardly bent edges of said arms being embedded in the wooden arms of the stale to lock the edges in place.

7. A D-handle comprising, in combination, a stale, a sheet metal casing secured to said stale and having two diverging arms 4, said casing being formed of two similar pieces 1 and 2, opposed grip sockets 11 at the spaced ends of the metal arms 4, flat ears 14 provided by the arms 4 at the sockets 11 and a grip-piece 12 having its ends fitted into said sockets and provided with preformed flat surfaces engaged with the ears 14 to prevent rotation of the grip-piece.

8. A D-handle comprising, in combination, a stale, a sheet metal casing secured to said stale and having two diverging arms 4, said casing being formed of two similar pieces 1 and 2 and means at the lower end of the casing overlapping and connecting the pieces 1 and 2 and said means being partly welded with the pieces 1 and 2 to secure them together in a strong union for a portion of their length at their meeting edges.

9. A D-handle construction for shovels and the like comprising, in combination, a sheet metal part having two diverging hollow arms each provided with a substantially flat face facing the flat face of the other, a grip-piece located between the spaced ends of said diverging arms, a wooden stale split at one end and having the split portion fitting within the arms of the sheet metal part and means extending inwardly from the flat faces of said arms for securing embedded co-action with those portions of the split stale extending into the said hollow arms.

In testimony whereof, I have signed my name to this specification.

WILLIAM A. READY.